United States Patent [19]

Henry

[11] Patent Number: 4,705,233
[45] Date of Patent: Nov. 10, 1987

[54] TRUSTWORTHY SIMPLIFIED VACUUM SYSTEMS

[76] Inventor: Richard D. Henry, Hookstown Grade Rd., R.D. #1, Box 331-A, Clinton, Pa. 15026

[21] Appl. No.: 826,330

[22] Filed: Feb. 5, 1986

[51] Int. Cl.[4] .............................................. B64D 41/00
[52] U.S. Cl. ...................................... 244/1 R; 74/5.7; 73/178 R; 244/53 R; 244/58
[58] Field of Search ................... 244/134 R, 53 R, 58, 244/1 R; 261/DIG. 12; 417/151, 198, 65, 197; 60/39.093; 74/5.7; 73/178 R; 98/1.7

[56] References Cited

U.S. PATENT DOCUMENTS

| | | | |
|---|---|---|---|
| 1,407,491 | 2/1922 | Sperry | 74/5.7 |
| 2,080,490 | 5/1937 | Kollsman | 74/5.7 |
| 2,136,532 | 11/1938 | West | 417/198 |
| 2,181,250 | 11/1939 | Reichel | 74/5.7 |
| 2,231,090 | 2/1941 | Ross | 417/198 |
| 2,272,986 | 2/1942 | Weinkauff | 74/5.7 |
| 3,261,576 | 7/1966 | Valyi | 244/209 |
| 4,364,268 | 12/1982 | Zompolas | 417/3 |
| 4,550,564 | 11/1985 | Callahan et al. | 60/39.093 |

OTHER PUBLICATIONS

The Aviation Consumer, Jun. 15, 1984, p. 3.
Precise Flight Inc., 63120 Powell Butte Rd., Bend, OR 97701, Standby Vacuum System, SVS III, 12/07/84 (3 pages).
US AIR Boeing 727-200 Pilots Handbook, Emergency, pp. 1-35-1, 1-35-2 & Inst/Nav/Comm, pp. 13-85-1, 13-85-2, all dated 6/01/85.

Primary Examiner—Galen Barefoot

[57] ABSTRACT

Vacuum systems deriving their trustworthiness by means of simplified apparatus, wherein, the vacuum source will be derived from simple venturis common to the state of the art, whereby, ice prevention will be achieved by use of bleed air from the turbine section of the jet engine used to power the aircraft. Venturi ice prevention will be selectable by the pilot and will fail safe to the on position should the aircraft encounter a complete electrical failure. The remaining units comprising of the vacuum system and connective tubing will all be common to the state of the art. One of the vacuum systems will supply regulated vacuum pressure to the earth reference gyros by means of a venturi being located within the inlet mouth of a jet engine, said pressure then routed to a pressure regulator and then routed to the gyros, therefore, regulated pressure will be available immediately following engine start and will remain available in flight even should its respective engine fail. Another vacuum system will supply variable vacuum pressure to the rate gyros, said variable being responsive to and proportional with the speed of the aircraft, thereby, the deflective sensitivity of the rate gyros will increase should the speed of the craft increase, conversely, the deflective sensitivity will decrease should the speed of the craft decrease, thus, speed compensated rate gyros.

3 Claims, 3 Drawing Figures

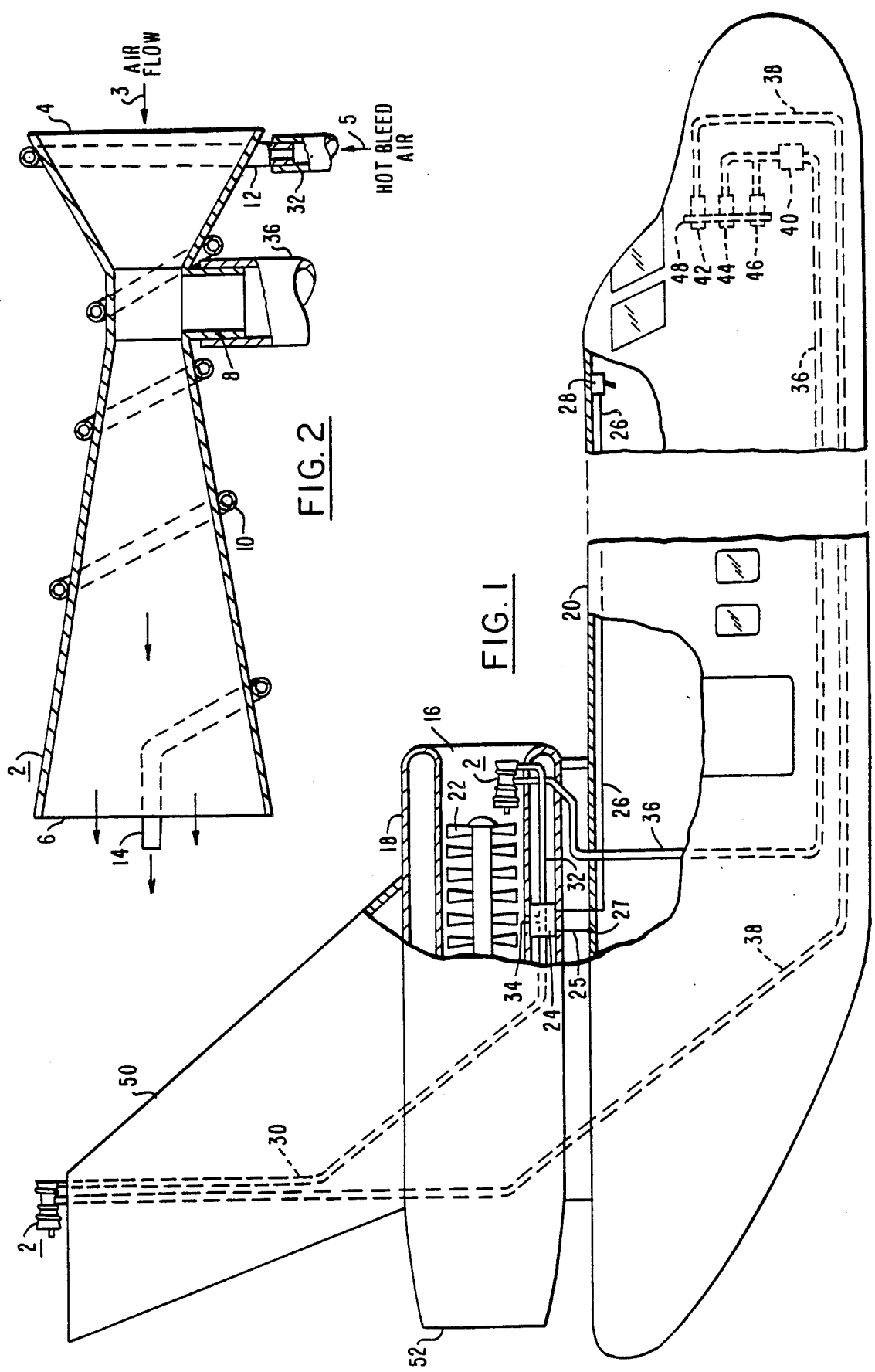

TRUSTWORTHY SIMPLIFIED VACUUM SYSTEMS

BACKGROUND OF THE INVENTION

The gyro redundancy available to the pilot of a modern jet airliner is surely a sham to say the least. This new invention will provide the means to achieve good reliable trustworthy redundancy should the need ever arise. Most modern jet airliners by regulation are only required to provide 30 minutes of gyro redundancy, wherein, the redundancy is totally dependent upon on electrical battery, said battery being at the total mercy of Murphy and his infamous law. By use of this new invention, good reliable redundancy is achieved thru the use of vacuum gyros as a back-up for the normal electrical gyros. Trustworthiness of the vacuum source is assured by the use of a simple venturi and a simplified de-ice and or anti-ice system, heat for said system being derived by means of a bleed air tap of hot compressed air from the turbine compressor section of the jet engines used to power the aircraft.

OBJECTS OF THE INVENTION

The main object of the present invention is to provide turbo-jet powered aircraft with good reliable means to guarantee gyro redundancy. A further object of the present invention is avoidance of reliance upon electrical systems or batteries to provide desired redundancy. A further object of the present invention is to provide reliable de-ice and or anti-ice means for the venturi vacuum power sources. A further object of the invention is to provide the predescribed redundancy at a minimal cost by use of simplified means.

DRAWINGS

FIG. 1 is a side view portraying the operational layout of the TRUSTWORTHY SIMPLIFIED VACUUM SYSTEMS aboard a TURBO-JET powered aircraft, wherein, certain areas are shown in section for portrayal enhancement.

FIG. 2 is a side view of the vacuum source comprising of a venturi and its appended deice-antiice system, said view being in side section.

DETAILED DESCRIPTION OF DRAWINGS

Figure 3:
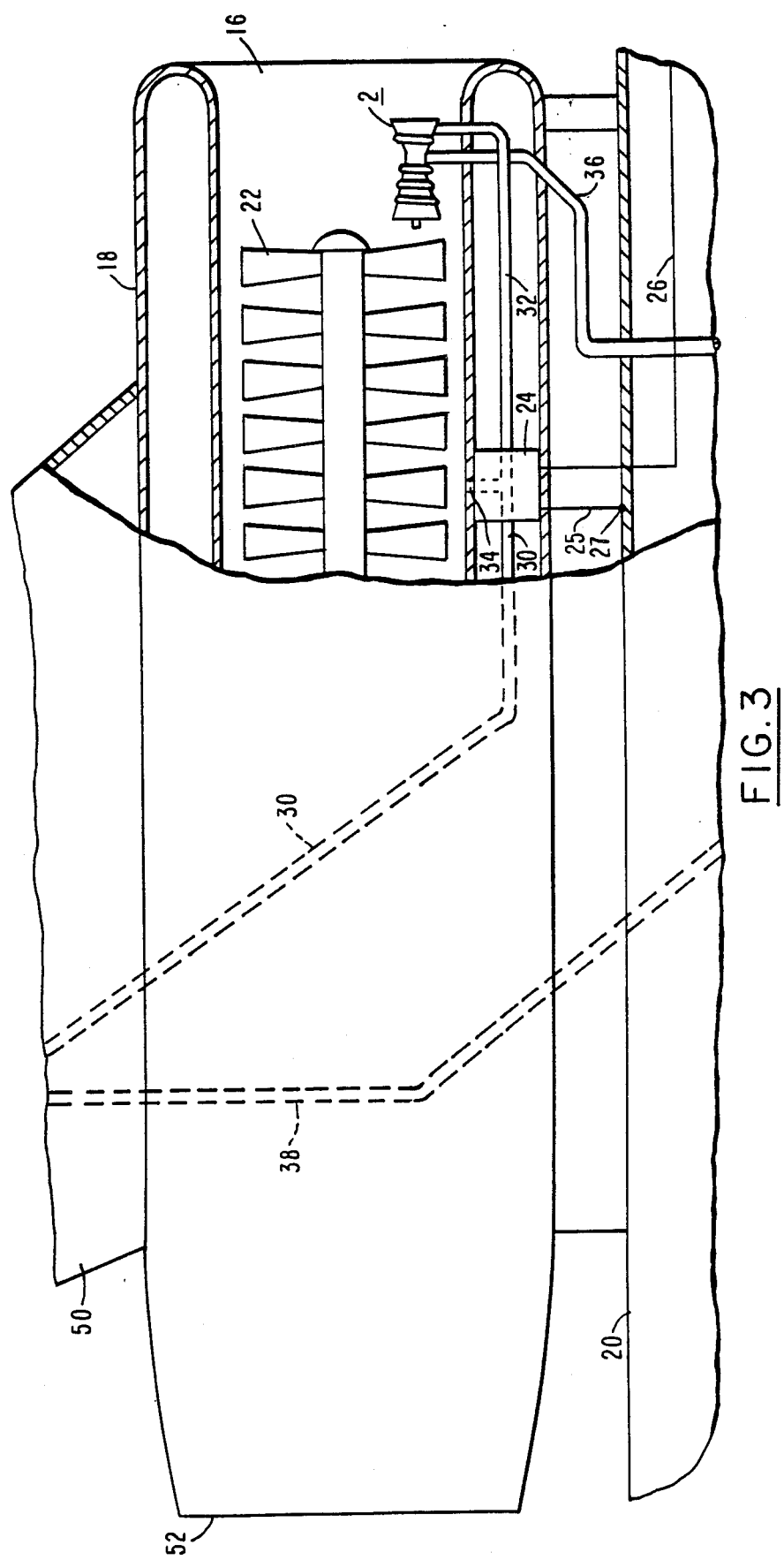
FIG. 3 is a side view of an aircraft TURBO-JET engine, said view being expanded and area sectionalized for the portrayal enhancement of the engine compressor section also showing the venturi vacuum source in full and further expanded, likewise its appended deice-antiice system and connective plumbing.

FIG. 1 shows a side view of an aircraft, certain areas being expanded and area sectionalized for portrayal enhancement of the layout of the vacuum systems, their deice-antiice systems, the instrument panel, its gyros and connective tubing.

FIG. 2 shows the vacuum source venturi and its deice-antiice system in side section.

FIG. 3 is an expanded view of the TURBO-JET engine, area sectioned for portrayal of the compressor section, the vacuum source venturi, the bleed air tap, the solenoid control valve the venturi deice-antiice system and connective tubing.

Referring to FIG. 2 we see a simple venturi 2, thru which we see air flow 3 into the mouth of the venturi, said mouth being 4, said air flow 3 making its exit at venturi tail 6, thus inducing a vacuum in tube 8. Venturi 2 is deiced-antiiced by means of hot bleed air 5 passing thru tube 10, said tubing being spiral wrapped around the outer circumference of the venturi 2, wherein, tubing 10 will be brazed or welded to said venturi so as to improve conductive heat transfer. Hot bleed air 5 is portrayed to arrive by means of high temperature tubing 32 thereby connected to high temperature tubing 10 at entrance end 12, wherein hot air 5 will pass thru spiral wrapped tube 10 and exit from tube 10 at exit end 14. Vacuum in tube 8 will be applied to the aircraft gyros by means of connective tubing 36.

Referring to FIG. 1 we see aircraft 20, turbo-jet engine 18, engine inlet mouth 16, vacuum source venturi 2 located within mouth inlet 16, wherein, air will be drawn thru venturi 2 by the suction induced by engine compressor 22, whereby, the vacuum created by venturi 2 will be applied to gyro horizon 44 and directional gyro 46 by means of tubing 36, wherein, maximum vacuum pressure will be controlled by pressure relief valve 40 thereto serially connected. At the fifth stage of compressor 22 we see air tap 34, whereby hot compressed bleed air will pass thru solenoid control valve 24 into a tee within the control valve, thereby into high temperature tubing 32 for the deice or anti-ice of venturi 2, wherein, said deice-antiice will be selectively controlled by the pilot by switch 28. As solenoid control valves are common to the state of the art, the internal workings of said valve 24 will not be shown but will be portrayed in the open position and it will be further understood that said valve will be closed when electrically energized and open by spring load when deenergized, thereby providing fail safe protection to antiice should one encounter a complete electrical failure. Control will be by hot lead 26, thru solenoid coil not shown, thru ground wire 25 to ground post 27, controllable by switch 28, hot lead into switch 28 from the essential bus not shown as likewise common to the state of the art.

Again referring to FIG. 1 we see another venturi 2 located atop the tail of the aircraft, wherein, vacuum produced by said venturi 2 will be applied to the speed compensated rate gyro 42 by means of tubing 38 wherein, tubing 38 will be rounted down thru tail section 50, around the outer circumference of the engine 18 but within its respective cowling, down thru the engine mounting strut into the aircraft fuselage, along the bottom thereof, into the nose section of the aircraft and then directed up to the speed compensated rate gyro 42 mounted upon the instrument panel 48. Deice or antiice of said venturi 2 will be by means of compressed hot bleed air, thru orifice 34 into line tee within solenoid control valve 24 into tubing 30, said tubing routed around engine 18, within its cowling, up thru and within the structure of tail 50 to achieve the deicing of venturi 2 mounted atop tail 50. Air will enter engine 18 at its inlet 16 and will exhaust out the tail end 52 of said engine. Referring to FIG. 3 we likewise see an expanded view of the predescribed.

Solenoid control valve 24 may be removed and replaced by a common pipe tee, wherein by this simplification, venturi anti-ice will be continuous during engine operation. Pipe tee not shown as they are common to the state of the art.

OPERATION

In operation the venturi 2 reference FIG. 2 will be installed upon the aircraft at two differing locations, one atop the tail 50 of the aircraft 20 reference FIG. 1 and another within the air intake inlet 16 of the engine 18. Venturi 2 atop the tail 50 will be under the influence of the relative airstream, therefore, vacuum produced thereby will be proportional thereto. As the speed of the aircraft increases the vacuum thereby produced likewise increases, conversely, should the speed decrease the vacuum likewise will decrease, whereby, the spin RPM of rate gyro 42 will be responsive thereto thereby providing speed compensation for said rate gyro as is desired to insure against overbanking of the craft while flying in reference thereto, during high speed flight likewise protecting against underbanking during low speed flight. The rate gyro will obviously be a variable rate gyro therefore not to be used for timed turns but strictly to be used for lateral banking reference. Slow gyro rotor spin up during take off is little if any problem due to the fact that gyro 42 possesses a spring erected gimbal cage therefore guaranteed proper erection irrespective of low rotor spin RPM. Variable vacuum pressure of venturi 2 thereby produced will be applied to the case of rate gyro 42 by means of tubing 38 routed thereto. Deice or antiice of venturi 2 atop tail 50 will be provided by compressed hot bleed air produced by compressor 22 passing thru orifice 34, thru solenoid control valve 24, into line tee within said solenoid, thru line 30 routed up thru tail 50 to achieve the deice-antiice of the venturi. For deice or antiice detail one must reference to FIG. 2 for an expanded view, wherein, line 30 will be the hot air feed tube in lieu of tube 32 as depicted, hot air 5 will then enter into spiral wrapped tube 10 at entrance end 12, pass thru tube 10 and exit at exhaust end 14. By reference to FIG. 2, for the predescribed case, tube 38 will be used in lieu of tube 36 as is depicted.

Another venturi 2 will be installed within the engine inlet 16 so as to provide a vacuum source following engine start up. In operation the blades of the compressor 22 of engine 18 will draw air thru the venturi 2 thereby producing vacuum pressure proportional to the speed of the air passing thru the venturi and likewise receiving enhanced boost indigenous of its location within a low pressure area produced by the draw force of compressor 22, likewise vacuum will obviously increase as the speed of the aircraft increases. Vacuum pressure will be held at a constant value of four inches by pressure relief valve 40 thereby applying said pressure to earth reference gyros 44 and 46 by means of connective tubing 36.

Due to the free swinging gimbal cages of Gyro Horizon 44 and the Directional Gyro 46 it is essential that proper erection is achieved before take-off, therefore may be achieved by erecting to earth reference following start up of engine 18. For operational detail one must again reference to FIG. 2, wherein, following engine start up the engine compressor section will draw an air flow 3 thru the venturi 2, passing thru the venturi inlet 4, said airflow passing thru said venturi will exit at venturi tail end 6, said air flow thereby producing a vacuum at tubing port 8, said vacuum pressure applied to the earth reference gyros by means of connective tubing 36. The de-icing or anti-icing of said venturi will be the same as predescribed with the exception that this venturi de-ice or anti-ice hot compressed air will take the other branch of the solenoid passageway tee and be routed thru connective tubing 32. FIG. 3 is merely an expanded view of the engine section and component parts so as to enhance the detail of the predescribed recitation for FIG. 1. Electrically controlled solenoid air valves are common to the state of the art, therefore, the internal workings thereof have been deleted, said valve being portrayed in the de-energized fail safe open position, spring loaded thereto, wherein, it will be understood but not shown that the pilot may select de-ice or anti-ice switch to the off position, said selection will energize the control solenoid thereby closing the valve. In operation should the aircraft encounter a total electrical failure the solenoid control valve will automatically open by means of spring loaded action. It will be further understood that solenoid control switch 28 will receive electrical power feed from the essential electrical bus, said feed not shown as it is common to the state of the art. De-ice or anti-ice will be selectable by the pilot by means of switch 28, said switch will control electrical power to solenoid 24 by means of hot wire 26, de-energized on, energized off, wherein, when selected to the off position the electrical current will pass thru the solenoid coil (not shown), then to ground terminal 27 by means of ground wire 25, ground terminal 27 being fixably attached to the metal structure of aircraft 20.

It will be understood that the venturis are portrayed in considerable oversize so as to enhance said portrayal.

If further simplification is desired, solenoid control valve 24 may be removed and replaced by a common pipe tee, wherein, venturi anti-ice will be continuous during engine operation. NOTE: Pipe tee not shown as they are common to the state of the art.

What I claim is:

1. A vacuum system apparatus for an aircraft comprising of a de-iced or anti-iced venturi, said venturi located within the inlet throat of a turbo-jet engine, apparatus further comprising a pressure regulator and connective tubing connecting said vacuum system to a gyro system onboard the aircraft to provide regulated vacuum pressure for the gyro systems of the aircraft, said vacuum pressure available by means of air being drawn thru said venturi immediately following engine start up due to extreme draw force of the compressor section of said turbo-jet engine, likewise, said vacuum pressure receives additional boost due to extreme low pressure indigenous to the location of said venturi within said inlet throat of said turbo-jet engine and further vacuum boost will be available as the aircraft increases its speed during flight due to increase airflow thru said venturi.

2. A vacuum system in accordance with claim 1 wherein, said de-iced or anti-iced venturi comprising apparatus of a spiral wrapped de-ice tube, said spiraled tubing being wrapped around the exterior wall of said venturi, said tubing being brazed or welded to the exterior surface of said venturi, a bleed air tap, said tap located at a down line stage of the compressor section of said turbo-jet engine, spiral tubing to receive hot bleed air from said bleed air tap by means of connective tubing, said hot bleed air to eject from the down line end following the final wrap of said spiraled tubing, whereby, said venturi will derive de-ice or anti-ice heat by means of conduction, said conduction enhanced by said brazing or welding of said spiraled tube to the exterior wall of said venturi.

3. A vacuum system according to claim 2, apparatus additionally comprising a solenoid controlled air valve, said air valve serially connected between the bleed air tap and the spiral wrapped de-ice or anti-ice tube, said solenoid controlled air valve to selectively control the flow or lack thereof of hot bleed air to its respective venturi appended de-ice tube, said solenoid air valve being fail safe spring loaded to the open position when de-energized, conversely, closed when energized, said solenoid valve controllable by the pilot, selectable by an on off switch, said switch deriving electrical power by means of connective wiring to a hot electrical bus, power to pass thru said switch to said solenoid by means of connective wiring, thru internal coil of said solenoid, then to aircraft structure ground.

* * * * *